US012165510B1

(12) United States Patent
Soto, Jr. et al.

(10) Patent No.: US 12,165,510 B1
(45) Date of Patent: Dec. 10, 2024

(54) VISUAL ALERT SYSTEM AND METHOD OF USE

(71) Applicants: Gilberto G Soto, Jr., Fort Worth, TX (US); Zachary M Beaudreault, Northlake, TX (US); Anita L Beaudreault, Northlake, TX (US)

(72) Inventors: Gilberto G Soto, Jr., Fort Worth, TX (US); Zachary M Beaudreault, Northlake, TX (US); Anita L Beaudreault, Northlake, TX (US)

( * ) Notice: Subject to any disclaimer, the term of this patent is extended or adjusted under 35 U.S.C. 154(b) by 30 days.

(21) Appl. No.: 18/099,721

(22) Filed: Jan. 20, 2023

Related U.S. Application Data

(60) Provisional application No. 63/403,231, filed on Sep. 1, 2022.

(51) Int. Cl.
*G08G 1/095* (2006.01)
*G08G 1/00* (2006.01)
*G08G 1/09* (2006.01)

(52) U.S. Cl.
CPC ............... *G08G 1/095* (2013.01); *G08G 1/00* (2013.01); *G08G 1/09* (2013.01)

(58) Field of Classification Search
CPC G08G 1/00; G08G 1/09; G08G 1/095; G08G 1/0955; G08G 1/097; G08B 7/06; F21L 4/00; F21L 4/02; F21V 21/06; F21V 33/00
See application file for complete search history.

(56) References Cited

U.S. PATENT DOCUMENTS

| | | | | | |
|---|---|---|---|---|---|
| 4,253,415 | A * | 3/1981 | Ferch | E01F 9/629 116/63 P |
| 5,091,828 | A * | 2/1992 | Jincks | B60Q 1/2611 362/373 |
| 9,437,109 | B1 * | 9/2016 | Stafford | B60Q 7/00 |
| 2016/0321921 | A1 * | 11/2016 | Stafford | B60Q 7/00 |

OTHER PUBLICATIONS

NPL Search (Apr. 22, 2024).*

* cited by examiner

*Primary Examiner* — Van T Trieu
(74) *Attorney, Agent, or Firm* — LEAVITT & ELDREDGE; Richard Eldredge

(57) ABSTRACT

An alert system includes a first housing extending from a first end to a second end; a control system engaged with the first housing, the control system having a power source and an activation control; a second housing; lights on the first housing or the second housing, the lights being controlled by the control system; and a connection extending between the first housing and the second housing the connection including at least one or more wires such that the lights are electronically connected to the control system; the lighting system is used for providing visual alerts.

6 Claims, 6 Drawing Sheets

VISUAL ALERT SYSTEM AND METHOD OF USE

BACKGROUND

1. Field of the Invention

The present invention relates generally to roadside visual alert systems, and more specifically, to a visual alert system that uses lights to provide a visual alert that is reusable and visible in all weather conditions.

2. Description of Related Art

Roadside visual alert systems are well known in the art and are effective means to improve safety. For example, FIG. 1 depicts a conventional system 101 having a plurality of flares 103, 105, 107 that provide flames that ignite along a roadside to alert others of hazards. During use, the flares will be lit and then placed or deployed along a road to create the alert.

One of the problems commonly associated with system 101 is limited use. For example, the flares are generally only used once before they are disposed of. In addition, the flares generally only last a short time frame and are limited in efficiency when weather conditions are wet and/or rainy.

Accordingly, although great strides have been made in the area of roadside visual alert systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
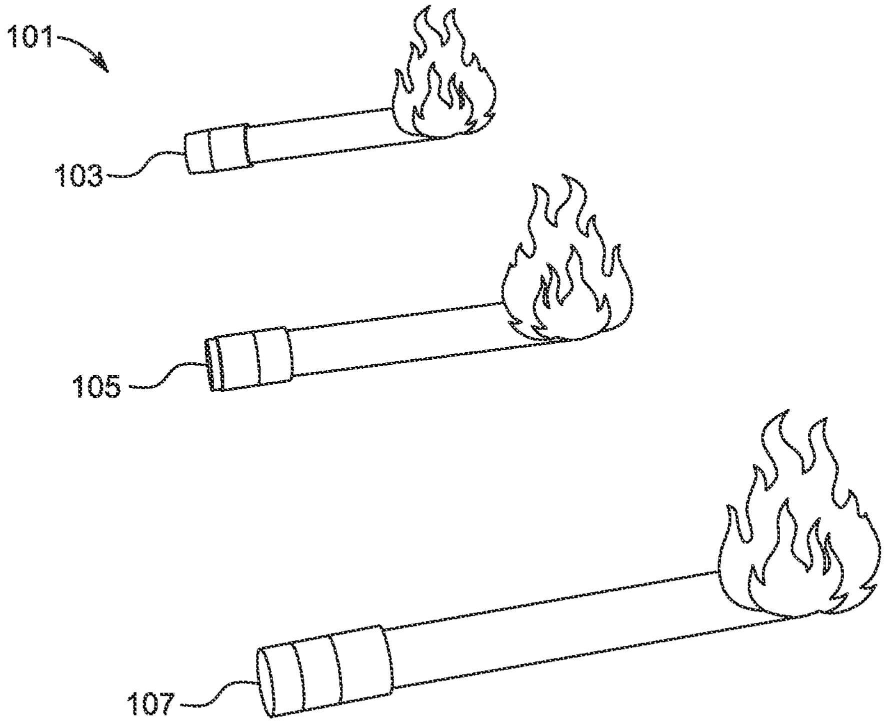
FIG. 1 (Prior Art)
FIG. 1 is a isometric view of a common alert system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional roadside alert systems. Specifically, the present invention utilizes lights which can be used in any weather conditions and a plurality of times. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
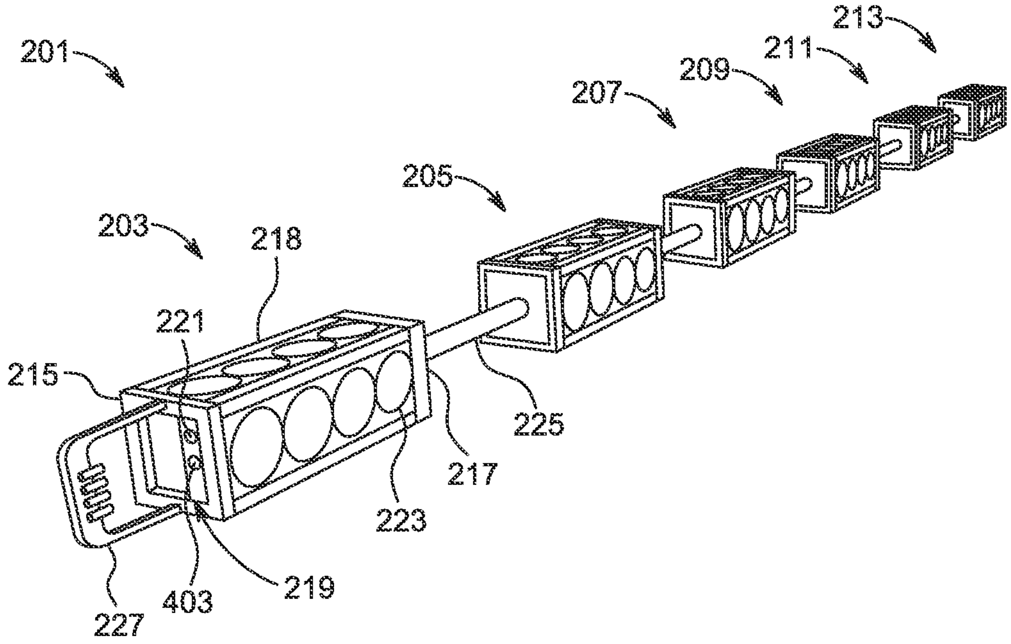
FIG. 2 is a top isometric view of an alert system in accordance with a preferred embodiment of the present application.
Figure 3:
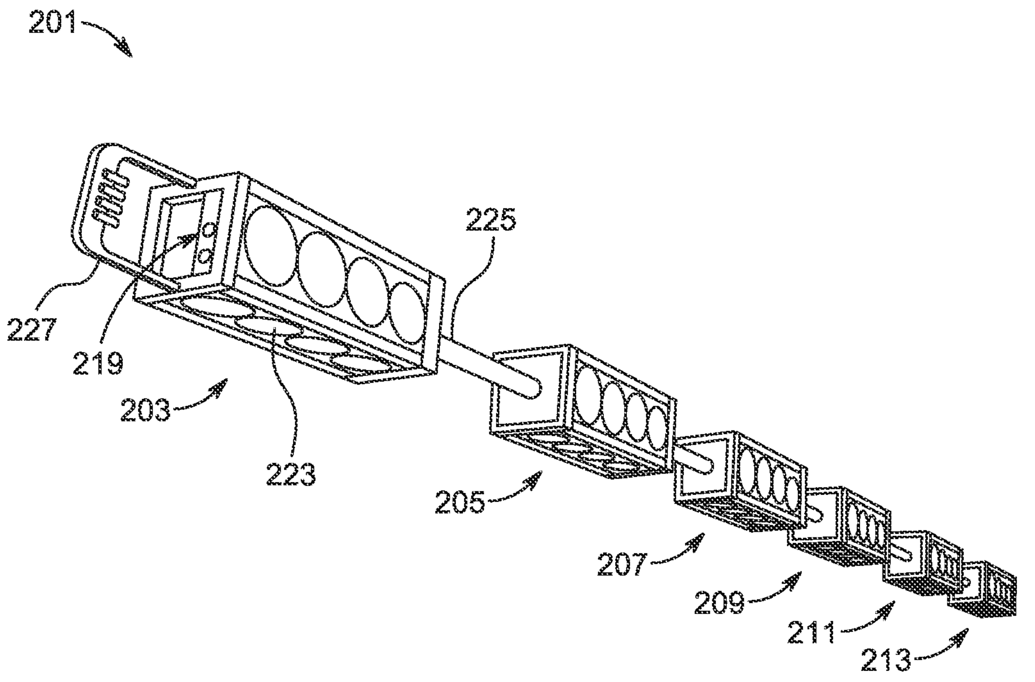
FIG. 3 is a bottom isometric view of the roadside alert system of FIG. 2.

Referring now to the drawings wherein like reference characters identify corresponding or similar elements throughout the several views, FIGS. 2 and 3 depict isometric views of a roadside alert system 201 in accordance with a preferred embodiment of the present application. It will be appreciated that system 201 overcomes one or more of the above-listed problems commonly associated with conventional alert systems.

Figure 4:
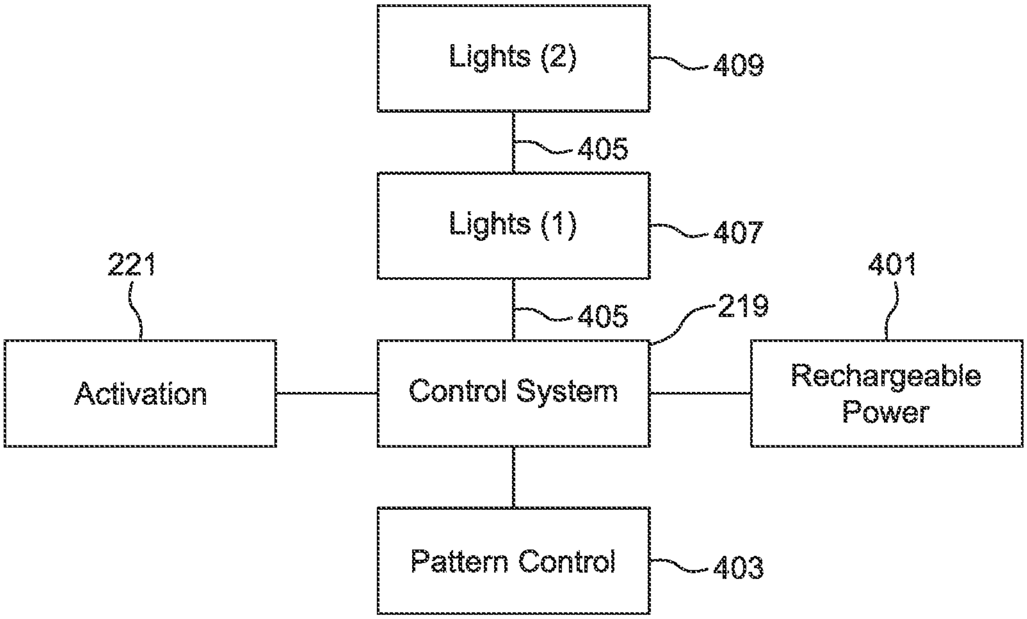
FIG. 4 is a schematic of the electronic components of the system of FIG. 2.

In the contemplated embodiment, system 201 includes a plurality of housings 203, 205, 207, 209, 211, 213. It should be appreciated that the number of housings can vary. Specifically, system 201 includes at least a first housing 203 extending from a first 215 end to a second end 217, the housing having a top side, a bottom side, a front side, and a back side (not shown). In some embodiments, the corners of the housings are covered with a shock absorbing material 218. A control system 219 is engaged with the first housing. As best shown in FIG. 4, the control system 219 includes a power source 401 and an activation control 221. The control system 219 will further include a pattern control 403 and is in electronic connection to each housing via one or more wires 405. The power source may be any known in the art, such as a removable and replaceable battery, a rechargeable battery, or any other. Further, the means of recharging can be those known in the art, such as solar power, outlet recharging, car outlets, or any others.

System 201 further includes a first plurality of lights 223 on the first housing, the first plurality of lights being controlled by the control system. Each of the remaining housings also include associated plurality of lights as shown. A connection 225 extends between the first housing and the subsequent housing, the connection including at least one or more wires such that the second plurality of lights is electronically connected to the control system. In some embodiments, the connection is created via tubing or the like, wherein the wires extend therein. Further, in at least some embodiments, the connection is a flexible conduit that allows for the housings to flex in relation to one another. This further allows for the plurality of housings to be deployed together as opposed to one at a time. Yet further, the connections can allow for the system to be modular, allowing for multiple housings to be connected and disconnected as desired by the user.

System 201 may further include a handle 227 attached to the first housing and used to deploy the system. During use, the user will activate the lights and deploy the system along a desired location, such as along the roadside. The plurality of lights will provide for a visual alert of a hazardous condition along the road as needed.

It should be appreciated that one of the unique features believed characteristic of the present application is the use of a plurality of housings with lights that provide for a reusable alert system that is effective in all weather conditions. In addition, the system provides for a modular style alert system, wherein the user can connect and disconnect housings as needed. The connections of the present invention further provide for flexible connections between the housings, to provide for easy deployment and flexible placing of the housings as needed.

As shown in FIG. 4, the control system 219 provides for the ability of the user to control the system 201. The user can select between a number of patterns with the pattern control, such as left sequential flashing, right sequential flashing, middle out, constant flashing, solid on, or any other type of pattern. The control system 219 further being in electronic communication with all of the lights, including the lights 407 of the first housing and the lights 409 of subsequent housings, thereby ensuring that all lights are controlled. It should be appreciated that the lights may vary, such as being LEDs, infrared, or any other means.

Figure 5:
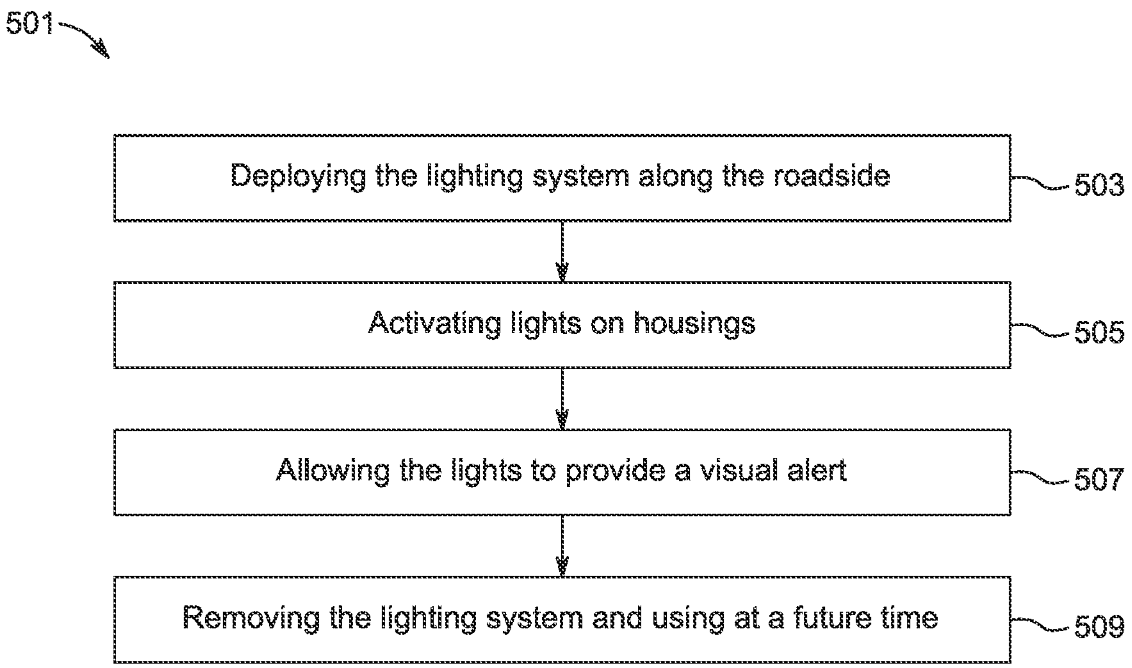
FIG. 5 is a flowchart of a method of use of the system of FIG. 2.

In FIG. 5, a flowchart 501 depicts a method of use of system 201. During use, the user will deploy the system along a desired location, as shown with box 503. Next the user will activate lights on the housings via the control system, as shown with box 505. The user will then allow the lights to provide the visual alert as needed, as shown with box 507. The user will be able to remove the system and use again at a later time as needed, as shown with box 509.

Figure 6:
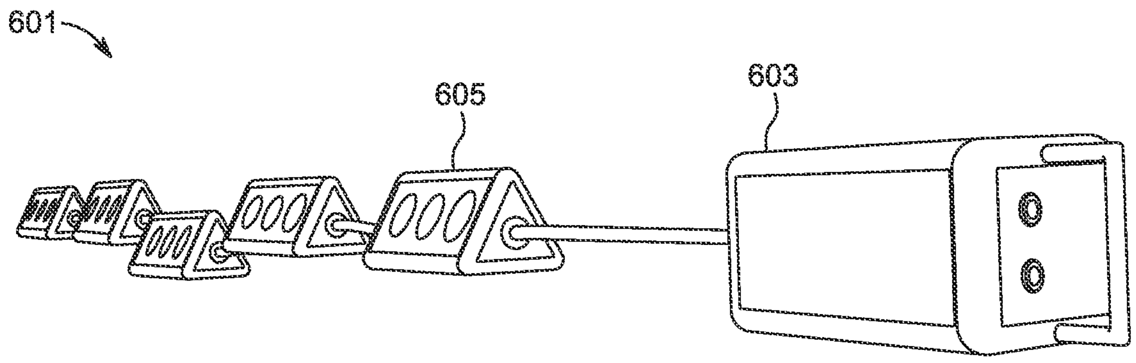
FIG. 6 is an isometric view of an alternative embodiment of an alert system in accordance with the present application.

In FIG. 6, another embodiment of an alert system 601 is shown, which may include some or all of the features discussed above. The system 601 including a first housing 603 which may not include lights, or in alternatives, may include lights, and second 605 and subsequent housings which may be of alternative shapes and include a plurality of lights as discussed above.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An alert system comprising:

a first housing extending from a first end to a second end, the first housing having four sides that form an elongated rectangular shape;

a control system carried within the first housing, the control system having a power source and an activation control configured to turn on and off a plurality of lights;

a second housing conductively coupled to the first housing via a cable, the second housing forming rectangular shape;

wherein the first plurality of lights on the first housing and on the second housing, the first plurality of lights being controlled by the control system, the first plurality of lights extending through all four sides or the first housing;

a connection extending between the first housing and the second housing the connection including at least one or more wires such that the second housing is electronically connected to the control system, the connection is a flexible conduit that extends from the first housing to the second housing;

wherein the lighting system is used for providing visual alerts.

2. The system of claim 1, further comprising: a handle attached to the first end of the first housing.

3. The system of claim 1, wherein the first plurality of lights are light emitting diodes.

4. The system of claim 1, wherein the control system includes a pattern control for activating a pattern associated with the first plurality of lights and second plurality of lights.

5. A method of providing visual alerts, the method comprising:

providing the system of claim 1;

extending the alert system along the roadside; and activating the first plurality of lights to create a visual alert.

6. The method of claim 5, wherein the control system includes a pattern control for activating a pattern associated with the first plurality of lights and second plurality of lights.

* * * * *